United States Patent
Priedeman, Jr.

(10) Patent No.: US 10,982,043 B2
(45) Date of Patent: Apr. 20, 2021

(54) RECYCLING AND REUSE OF SULFONATED POLYMER MATERIAL IN ADDITIVE MANUFACTURING

(71) Applicant: Stratasys, Inc., Eden Prairie, MN (US)

(72) Inventor: William R. Priedeman, Jr., Long Lake, MN (US)

(73) Assignee: Stratasys, Inc., Eden Prairie, MN (US)

(*) Notice: Subject to any disclaimer, the term of this patent is extended or adjusted under 35 U.S.C. 154(b) by 425 days.

(21) Appl. No.: 15/729,410

(22) Filed: Oct. 10, 2017

(65) Prior Publication Data

US 2018/0030234 A1     Feb. 1, 2018

Related U.S. Application Data

(63) Continuation-in-part of application No. PCT/US2016/038140, filed on Jun. 17, 2016.

(Continued)

(51) Int. Cl.

| | | |
|---|---|---|
| *C08G 63/688* | (2006.01) | |
| *C08G 69/42* | (2006.01) | |

(Continued)

(52) U.S. Cl.
CPC ........ *C08G 63/6886* (2013.01); *B29C 64/118* (2017.08); *B29C 64/40* (2017.08); *B33Y 30/00* (2014.12); *B33Y 70/00* (2014.12); *C08G 18/0828* (2013.01); *C08G 18/3855* (2013.01); *C08G 69/42* (2013.01); *C08J 5/00* (2013.01); *C08J 11/06* (2013.01); *G03G 9/08755* (2013.01); *G03G 9/08766* (2013.01); *G03G 15/1625* (2013.01); *G03G 15/224* (2013.01); *B29K 2081/00* (2013.01); *B29K 2995/0062* (2013.01); *C08J 2300/22* (2013.01);

(Continued)

(58) Field of Classification Search
CPC .................. C08G 63/6886; B29C 64/118
See application file for complete search history.

(56) References Cited

U.S. PATENT DOCUMENTS

| | | |
|---|---|---|
| 2,696,482 A | 12/1954 | Pease |
| 3,296,204 A | 1/1967 | Caldwell |

(Continued)

FOREIGN PATENT DOCUMENTS

| | | |
|---|---|---|
| CA | 3052023 A1 | 8/2018 |
| CN | 107206673 A | 2/2015 |

(Continued)

OTHER PUBLICATIONS

China Office Action, 201680035689.9, dated Nov. 5, 2019, 11 pages.

(Continued)

*Primary Examiner* — Larry W Thrower
(74) *Attorney, Agent, or Firm* — Westman, Champlin & Koehler, P.A.

(57) ABSTRACT

A method of recycling and reusing a tap water-soluble sulfonated polymer material from a structural component made using an additive manufacturing process comprises dissolving the structural component in water to disperse the sulfonated polymer material into the water. The sulfonated polymer material is precipitated from the water and recovered; then dried and reformed into a form suitable for subsequent use as a consumable feedstock in a subsequent additive manufacturing process.

12 Claims, 3 Drawing Sheets

Related U.S. Application Data

(60) Provisional application No. 62/182,159, filed on Jun. 19, 2015.

(51) Int. Cl.
| | |
|---|---|
| *B33Y 70/00* | (2020.01) |
| *B33Y 30/00* | (2015.01) |
| *G03G 15/22* | (2006.01) |
| *G03G 15/16* | (2006.01) |
| *C08G 18/38* | (2006.01) |
| *C08G 18/08* | (2006.01) |
| *B29C 64/118* | (2017.01) |
| *C08J 5/00* | (2006.01) |
| *C08J 11/06* | (2006.01) |
| *G03G 9/087* | (2006.01) |
| *B29C 64/40* | (2017.01) |
| *B29K 81/00* | (2006.01) |

(52) U.S. Cl.
CPC ........ *C08J 2355/02* (2013.01); *C08J 2367/02* (2013.01); *C08J 2367/04* (2013.01); *C08J 2369/00* (2013.01); *C08J 2377/06* (2013.01); *C08J 2467/02* (2013.01); *C08J 2477/06* (2013.01); *G03G 2215/1695* (2013.01)

(56) References Cited

U.S. PATENT DOCUMENTS

| | | | |
|---|---|---|---|
| 3,779,993 | A | 12/1973 | Kibler et al. |
| 4,304,901 | A | 12/1981 | O'Neill et al. |
| 4,801,388 | A | 1/1989 | Fong et al. |
| 4,931,510 | A | 6/1990 | Sackmann et al. |
| 5,369,210 | A | 11/1994 | George et al. |
| 5,503,785 | A | 4/1996 | Crump et al. |
| 5,679,754 | A | 10/1997 | Larson et al. |
| 6,004,124 | A | 12/1999 | Swanson et al. |
| 6,067,480 | A | 5/2000 | Stuffle et al. |
| 6,070,107 | A | 5/2000 | Lombardi et al. |
| 6,228,923 | B1 | 5/2001 | Lombardi et al. |
| 6,437,034 | B2 | 8/2002 | Lombardi et al. |
| 6,488,994 | B1 | 12/2002 | Haller et al. |
| 6,547,995 | B1 | 4/2003 | Comb |
| 6,680,364 | B1 | 1/2004 | Linemann |
| 7,122,246 | B2 | 10/2006 | Comb et al. |
| 7,384,255 | B2 | 6/2008 | LaBossiere et al. |
| 7,604,470 | B2 | 10/2009 | LaBossiere et al. |
| 7,625,200 | B2 | 12/2009 | Leavitt |
| 7,896,209 | B2 | 3/2011 | Batchelder et al. |
| 8,153,182 | B2 | 4/2012 | Comb et al. |
| 8,419,996 | B2 | 4/2013 | Swanson et al. |
| 8,647,102 | B2 | 2/2014 | Swanson et al. |
| 8,879,957 | B2 | 11/2014 | Hanson et al. |
| 9,399,691 | B2 | 7/2016 | Ruggieri et al. |
| 9,423,756 | B2 | 8/2016 | Hanson et al. |
| 9,523,934 | B2 | 12/2016 | Orrock et al. |
| 9,557,661 | B2 | 1/2017 | Martin |
| 9,777,090 | B2 | 10/2017 | Ruggieri et al. |
| 10,100,168 | B2 | 10/2018 | Bayer et al. |
| 10,308,743 | B2 | 6/2019 | Ruggieri |
| 2005/0004282 | A1 | 1/2005 | Priedeman et al. |
| 2013/0077996 | A1 | 3/2013 | Hanson et al. |
| 2013/0077997 | A1 | 3/2013 | Hanson et al. |
| 2013/0186549 | A1 | 7/2013 | Comb et al. |
| 2013/0186558 | A1 | 7/2013 | Comb et al. |
| 2013/0192779 | A1 | 8/2013 | Parker et al. |
| 2017/0022341 | A1 | 1/2017 | Bayer et al. |
| 2017/0232684 | A1 | 8/2017 | Yoshimura et al. |
| 2017/0240675 | A1 | 8/2017 | Yoshimura et al. |
| 2017/0369622 | A1 | 12/2017 | Inouble et al. |
| 2018/0009160 | A1 | 1/2018 | Sawada et al. |
| 2018/0050495 | A1 | 2/2018 | Stolyarov et al. |
| 2018/0142077 | A1 | 5/2018 | Kimura et al. |

FOREIGN PATENT DOCUMENTS

| | | |
|---|---|---|
| CN | 104520484 A | 4/2015 |
| GB | 717840 A | 11/1954 |
| GB | 1066188 | 2/1966 |
| JP | 2008507619 A | 3/2008 |
| JP | 2013247177 A | 12/2013 |
| JP | 2014040085 A | 3/2014 |
| JP | 2017030346 A | 2/2017 |
| KR | 10-2014-0119785 A | 10/2014 |
| WO | 2006020279 A2 | 2/2006 |
| WO | 2006020279 A3 | 2/2006 |
| WO | 2010/045147 A2 | 4/2010 |
| WO | 2012143182 A1 | 10/2012 |
| WO | 2014072147 A1 | 5/2014 |
| WO | 2015175682 A1 | 11/2015 |
| WO | 2016/059986 A1 | 4/2016 |
| WO | 2016185874 A1 | 11/2016 |
| WO | 2016205690 A1 | 12/2016 |
| WO | 2017112687 A1 | 6/2017 |
| WO | 2017167691 A1 | 10/2017 |

OTHER PUBLICATIONS

Canadian Office Action, 2,989,059, dated Jun. 17, 2019, 3 pages.
Japanese Office Action dated Oct. 30, 2018 for corresponding Japanese Application No. 2017-564868, filed Dec. 14, 2017.
Canadian Office Action dated Nov. 14, 2018 for corresponding Canadian Application No. 2,989,059, filed Dec. 8, 2017.
International Preliminary Report on Patentability dated Dec. 19, 2017 for corresponding International Application No. PCT/US2016/038140, filed Jun. 17, 2016.
International Search Report issued for PCT/US2016/038140, dated Oct. 4, 2016.
Written Opinion of the International Searching Authority issued for PCT/US2016/038140, dated Oct. 4, 2016.
Japanese Office Action dated Apr. 17, 2019 for corresponding Japanese Application No. 2017-564868, filed Dec. 14, 2017.
Korean Office Action dated Apr. 18, 2019 for corresponding Korean Application No. 10-2018-7001645, filed Jan. 18, 2018.
International Search Report and Written Opinion, PCT/US2019/055694, dated Mar. 6, 2020, 12 pages.
Prosecution history from U.S. Appl. No. 15/737,579, filed Dec. 18, 2017 including: Non-Final Rejection dateded Mar. 6, 2020 and Requirement for Restriction/Election dated Oct. 22, 2019.
International Search Report and Written Opinion of PCT/US2018/055277, dated Jan. 24, 2019.
Communication pursuant to Article 64(3) EPC from corresponding European Patent Application No. 16738251.4, dated Nov. 27, 2020.
Non-final Rejection from corresponding U.S. Appl. No. 15/737,579, dated Nov. 30, 2020.

RECYCLING AND REUSE OF SULFONATED POLYMER MATERIAL IN ADDITIVE MANUFACTURING

CROSS-REFERENCE TO RELATED APPLICATION(S)

This application is a continuation-in-part of International Application No. PCT/US2016/038140, filed on Jun. 17, 2016, which is based on and claims the benefit of U.S. provisional patent application Ser. No. 62/182,159, filed Jun. 19, 2015, the contents of which are hereby incorporated by reference in their entirety.

BACKGROUND

The present disclosure relates to reuse of water dispersible polymer previously used as support material in additive manufacturing systems for printing three-dimensional (3D) parts. In particular, the present disclosure relates to recovery of water dispersible polymer that was used as a support material in additive manufacturing systems, and subsequent reuse as a support material for build materials in additive manufacturing systems to print printed items.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes. In a fused deposition modeling additive manufacturing system, a 3D part of model may be printed from a digital representation of the 3D part in a layer-by-layer manner by extruding a flowable part material along tool paths. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane) after each layer is formed, and the process is then repeated to form a printed item resembling the digital representation.

In an electrophotographic 3D printing process, each slice of the digital representation of the 3D part and its support structure is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

In fabricating printed items by depositing layers of a part material, supporting layers or structures are typically built underneath overhanging portions or in cavities of printed items under construction, which are not supported by the part material itself. A support structure may be built utilizing the same deposition techniques by which the part material is deposited. A host computer generates additional geometry which acts as a support structure for the overhanging or free-space segments of the 3D part being formed. The support material adheres to the part material during fabrication, and is removable from the completed printed item when the printing process is complete. Prior art methods of removing support structure have included simply breaking the support structure off of the part material and then smoothing out any residual rough areas, or dissolving away soluble supports using a water-based solution. It is desirable in additive technologies to minimize raw material cost by minimizing the waste and disposal of materials used to build support structures.

SUMMARY

This disclosure describes a method of recovering a water dispersible sulfonated polymer material from a structural component made using an additive manufacturing process. The method comprises subjecting the structural component to water in a manner sufficient to disperse the water dispersible sulfonated polymer material into the water. The water dispersible sulfonated polymer material is then separated from the water; and reformed into a form suitable for subsequent use in a subsequent additive manufacturing process.

In one aspect, the water dispersible sulfonated polymer material is separated from the water by filtration, centrifugation, evaporation/drying, precipitation, sedimentation, or a combination thereof.

In another aspect, the water dispersible sulfonated polymer material is subjected to heat during reforming.

In another aspect, the water dispersible material is recovered in approximately 30 minutes or less.

in yet another aspect, the water dispersible sulfonated polymer material is recovered at ambient temperature.

In another aspect, a filament material suitable for use in an additive manufacturing process, comprises a water dispersible sulfonated polymer material obtained from a previously additive manufactured structure, the water dispersible sulfonated polymer material being up to 100% water dispersible material obtained from the previously manufactured structure and being in filament form.

In another aspect, a toner powder material suitable for use in an additive manufacturing process, comprises a water dispersible sulfonated polymer material obtained from a previously additive manufactured structure, the water dispersible sulfonated polymer material being up to 100% water dispersible sulfonated polymer material obtained from the previously manufactured structure and being in powder form.

In yet another aspect, a part is manufactured wherein up to 100% recovered water dispersible sulfonated polymer material recovered from a previously manufactured structure made by additive manufacturing is used to produce a support structure to support the part in a subsequent additive manufacturing process.

DEFINITIONS

Unless otherwise specified, the following terms as used herein have the meanings provided below:

The term "polymer" refers to a polymerized molecule having one or more monomer species, and includes homopolymers and copolymers. The term "copolymer" refers to a polymer having two or more monomer species, and includes terpolymers (i.e., copolymers having three monomer species).

The term "addition polymerization" refers to a polymer that is formed by an addition reaction where monomers bond together via rearrangement of bonds without the loss of any atom or molecule under specific conditions of heat, pressure, and/or the presence of a catalyst. Sometimes this type of polymerization is also referred to as "chain growth" polymerization, free radical polymerization, and such polymer chains may be self initiated through heat or require the use of a catalyst. Additive polymerization is in contrast to a condensation polymerization wherein the polymer is formed by a condensation reaction where a molecule, usually water, is lost during the formation.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers to one or more molecules of the chemical compound, rather than being limited to a single molecule of the chemical compound. Furthermore, the one or more molecules may or may not be identical, so long as they fall under the category of the chemical compound. Thus, for example, "a" polystyrene is interpreted to include one or more polymer molecules of the polystyrene, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polystyrene", "one or more polystyrenes", and "polystyrene(s)" may be used interchangeably and have the same meaning.

The terms "about", approximately and "substantially" are used herein with respect to measurable values and ranges due to expected variations known to those skilled in the art (e.g., limitations and variability in measurements).

The term "providing", such as when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

"Soluble" as referred to herein can be used interchangeably with "disintegrable" and "dissolvable" and relates to materials that disintegrate in a solution or dispersion. Upon disintegration, the water dispersible material can break apart into smaller pieces and/or particles of polymer in the solution or dispersion. Some or all of the water dispersible material may also dissolve into the solution or dispersion upon disintegration.

"Water soluble" as used herein relates to materials that dissolve in tap water that is about neutral pH. It is understood that the pH of tap water can vary depending on the municipality and as such the pH can vary between about 5 and about 9. Although these pH's are slightly basic or slightly acidic, the defining feature of the water soluble materials is that they do not require an acidic or basic solution to disintegrate and can disintegrate in water at about neutral pH, e.g. tap water.

"High temperature build environment" as referred to herein relates to build environments of about 45° C. or greater in additive manufacturing systems.

"Heat deflection temperature" or "heat distortion temperature" (HDT) is the temperature at which a polymer sample deforms under a specified load and is determined by the test procedure outlined in ASTM D648.

"Thermally stable" as referred to herein relates to the material having a heat deflection temperature sometimes referred to as heat distortion temperature (HDT) compatible with the desired build environment such that they do not exceed their thermal-degradation kinetics thresholds.

The term "polystyrene" referred to herein relates to an aromatic polymer made from a styrene monomer. Polystyrene's chemical formula is (C8H8)n. It is a thermoplastic polymer being formed by an addition type reaction wherein unsaturated groups such as ethylene connect the styrene monomers.

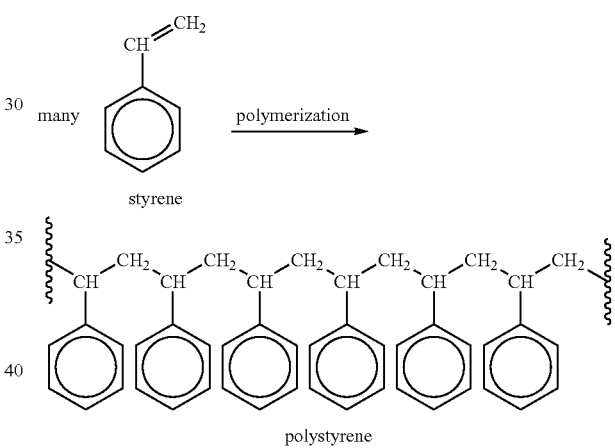

The term "vinyl" referred to herein is used interchangeably with the term "unsaturated" and refers to the double bond between two carbon atoms which is used to connect monomers to form the polymeric chain.

The term "sulfo-polymer" or "sulfonated polymer" referred to herein is a reaction product of monomers containing a sulfonate group. The terms sulfo-polymer or sulfonated polymer arte used interchangeably herein.

The term "polyethylene" referred to herein relates to a polymer formed of ethylene monomers through an addition type reaction having the general formula of (C2H4)n. Significant quantities of polyethylene (PE) are formed through free radical polymerization which is a form of addition type polymerization. Often, polyethylene is characterized by its density such as low density PE (LDPE), Medium density PE (MDPE) and High Density (HDPE), the density in each case being subject to the amount of linear or branched structure in the PE.

The term "polypropylene" (PP) referred to herein relates to a polymer formed of propylene monomers through an addition type reaction having the general formula of (C3H6)n. Structurally PP is similar to PE with a methyl group substituted on every other carbon in the main polymeric chain and therefore PP has many similar properties to PE. PP can also be produced as a copolymer with PE The term "polybutylene" (PB-1) referred to herein relates to a polymer formed of 1-butene monomers through an addition type reaction having the general formula of $(C4H8)n$.

The term "polyester" referred to herein relates to a polymer that contains an ester functional group in its main chain. As used herein, the term "sulfopolyester" means any polyester that contains a sulfomonomer.

The term "polyamide" referred to herein relates to both aliphatic and aromatic polyamides. In the case of an aliphatic polyamide such as nylon 6 and nylon 66, the amide link is produced from the condensation reaction of an amino group and a carboxylic acid group wherein water is eliminated. For aromatic polyamides or 'aramids' such as Kevlar, an acid chloride is used as a monomer. As used herein, the term "sulfopolyamide" means any polyamide that contains a sulfomonomer.

The term "polyurethane" referred to herein relates to polymers that are most commonly formed by reacting a di- or polyisocyanate with a polyol. As used herein, the term "sulfopolyurethane" means any polyurethane that contains a sulfomonomer.

The term "polylactic acid" (PLA) referred to herein relates to polymers that are a biodegradable thermoplastic aliphatic polyesters derived from materials originated from plants, such as corn starch, tapioca starch or sugarcane. The term polylactic acid may be misleading since it does not comply with IUPAC standard nomenclature because PLA is not a polyacid but rather a polyester. As used herein, the term "Sulfopolylactic acid or sulfoPLA" means any polylactic acid that contains a sulfomonomer.

The term "aliphatic polymer" referred to herein relates to a polymer formed of aliphatic monomers through an addition type reaction which have either straight or branched chains with no aromatic groups within the polymer chain.

All percentages in this disclosure are on a mole basis unless otherwise specified.

DETAILED DESCRIPTION

Figure 1:
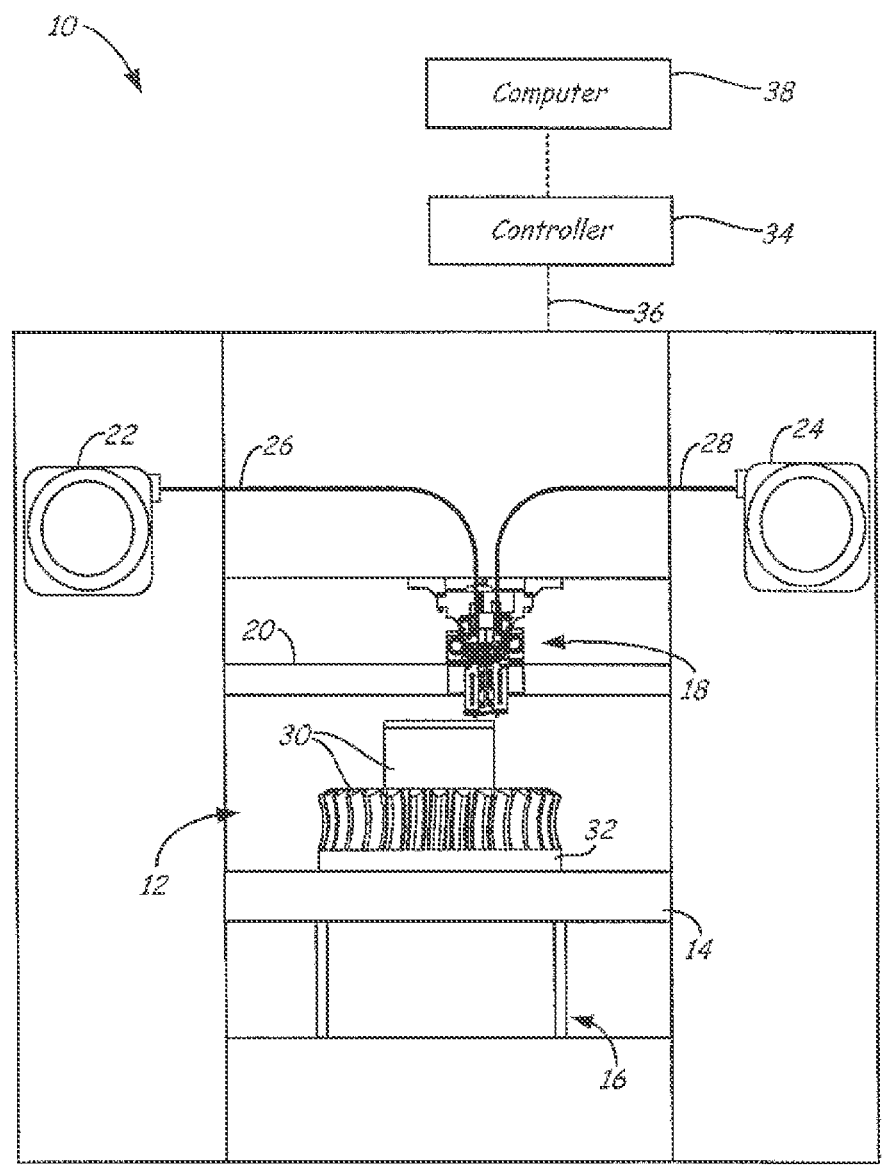
FIG. 1 is a front view of an extrusion-based additive manufacturing system configured to print printed parts and support structures, where the support structures are printed from a water dispersible material of the present disclosure.

The present disclosure is directed to a method of recycling and reusing a water dispersible sulfonated polymer material for use in 3D printing. In one aspect, the water dispersible polymer is a sulfonated polymer which can be used for printing sacrificial support structures for 3D parts built in a range of build temperature environments of additive manufacturing systems. It can also be used for layer-wise printing of dissolvable 3D parts. The sulfonated polymer material is made from an addition or condensation reaction, and its thermal properties can be tailored to the process in which it will be used, e.g., pairing the water dispersible sulfonated polymer with a material used for printing the 3D parts, by selecting a desired molecular weight for the reaction product.

The water dispersible sulfonated polymer of the present disclosure functions as a sacrificial material for an associated part material in additive manufacturing (aka 3D printing) applications. A sacrificial support material can be desirable where overhanging features are required, where significant angular slopes exist in the printed items and where it is essential to also preserve delicate features in the printed item, such as small orifices or controlled pore structures, and in some situations, to laterally encase the printed item. Once the item has been printed, the support structure of the water dispersible material is removed to reveal the completed printed item without damaging any of the critical or delicate geometrical features of the printed item. To accomplish this removal, the disclosed material is water dispersible, allowing the support structure to be at least partially and typically completely dissolved away from the printed item. The support structure made be made solely of the water dispersible polymer of this disclosure or other non-dispersible polymers may be incorporated therein as long as the water dispersibility is not substantially affected. In addition mixtures of other sulfonated polymers, water-soluble polymers, and non-soluble polymers; additives, fillers, and/or stabilizers may be added to the water dispersible polymer.

The present disclosure also includes the use of the water dispersible sulfonated polymer for manufacturing a dissolvable part suitable for downstream uses such as sacrificial tooling. A sacrificial tool encompassing the water dispersible polymer may be a dissolvable core type structure on which a part or device is subsequently produced or providing some type of platform for subsequent manufacture of a part or device. Such a process is distinguished from for example a direct additive manufacturing process wherein both the part and the support structure are concurrently printed. For example a device made of carbon fibers may be formed around the sacrificial tooling made of the water dispersible polymer. Once the carbon fiber device is made, the water dispersible polymer is disintegrated by introducing the water dispersible polymer to water.

The water used to disperse the water dispersible sulfonated polymer is plain tap or naturally occurring water. Removing a support structure from a 3D part or dissolving a sacrificial tool does not require the presence of a basic or acidic environment or heating of the aqueous solution. In addition, the solubility of the water dispersible material is sufficient for use of removal of supports in an automated process or hands-free manner Plain tap water typically has an average pH of approximately 7. However, water pH varies greatly, ranging anywhere from a pH between approximately 5.0 and 9 is also suitable. In any event, the pH of the water does not need to be adjusted to disintegrate the water dispersible polymer. After it disintegrates, the dispersed water soluble polymer solution may be processed by increasing the ionic strength of the solution to precipitate out the water dispersible polymer. The water (with the water soluble polymer removed) may then be recycled for reuse to dissolve the water dispersible polymer from subsequent parts.

In the embodiment of additive manufacturing, in order to effectively print a support structure in coordination with a printed item, for example in a fused deposition modeling process, amorphous support materials preferably have a glass transition temperature that is approximately equivalent to or higher than the Tg of the part material. For example a Tg of ±20 C with a more preferred range of ±15 C of the support material with respect to the Tg of the part material would be considered approximately equivalent. The size of the sulfonated monomer will have an effect on the Tg of the polymer. That is, the more additions of sulfonated monomer on a chain will increase the molecular weight and increase the Tg and heat deflection temperature of the sulfonated polymer material. This allows the matching of thermal properties of the support material to a part material, so that the consumable materials printed together as a material pair will have similar heat deflection temperatures and other thermal characteristics. For example, similar glass transition and heat deflection temperatures allow the part and support materials to be printed together in the same heated environment while preventing excessive distortions and curling.

For semi-crystalline or crystalline support materials, heat deflection temperature is more indicative of acceptable performance than Tg pairing of part and support materials. An example of suitably equivalent heat deflection temperatures are ±20° C. with a more preferred range of ±15° C.

The water dispersible sulfonated polymer material of the present disclosure may be configured for use with several different additive manufacturing techniques, such as extrusion-based additive manufacturing systems, high-speed sintering systems, selective laser sintering systems, electrophotography-based additive manufacturing systems, and the like. The water dispersible sulfonated polymer material may be configured in whatever feedstock geometries or format is required for use as a consumable material in a given additive manufacturing system or technology, including filament, ribbon, powder, liquid, pellet, or slug formats.

Depending on the additive manufacturing technique selected, it may be desired to customize the level of crystallinity of the polymeric material. For example, in SLS or other sintering applications, crystallinity is desired. In fused deposition modeling systems applications, it is typically more desirable to use amorphous or semi-crystalline polymeric materials. The level of crystallinity can be manipulated during manufacture of the material via monomer selection.

As shown in FIG. 1, system 10 is an example of an extrusion-based additive manufacturing system for printing or otherwise building 3D parts and support structures using a layer-based, additive manufacturing technique, where the support structures may be printed from the water dispersible sulfonated polymer material of the present disclosure. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 for printing printed parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner Example techniques for locally heating a deposition region include heating platen 14 and/or with directing heat air jets towards platen 14 and/or the printed parts/support structures being printed). The heating anneals the printed layers of the printed parts (and support structures) to partially relieve the residual stresses, thereby reducing curling of the printed parts and support structures.

Platen 14 is a platform on which printed parts and support structures are printed in a layer-by-layer manner In some embodiments, platen 14 may also include a flexible polymeric film or other substrate on which the printed parts and support structures are printed. In the shown example, print head 18 is a dual-tip extrusion head configured to receive consumable filaments from consumable assemblies 22 and 24 (e.g., via guide tubes 26 and 28) for printing printed 3D part 30 and support structure 32 on platen 14. Consumable assembly 22 may contain a supply of a part material, such as a high-performance part material, for printing printed 3D part 30 from the part material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print printed 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12 ), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34 ) to perform printing operations.

Figure 2:
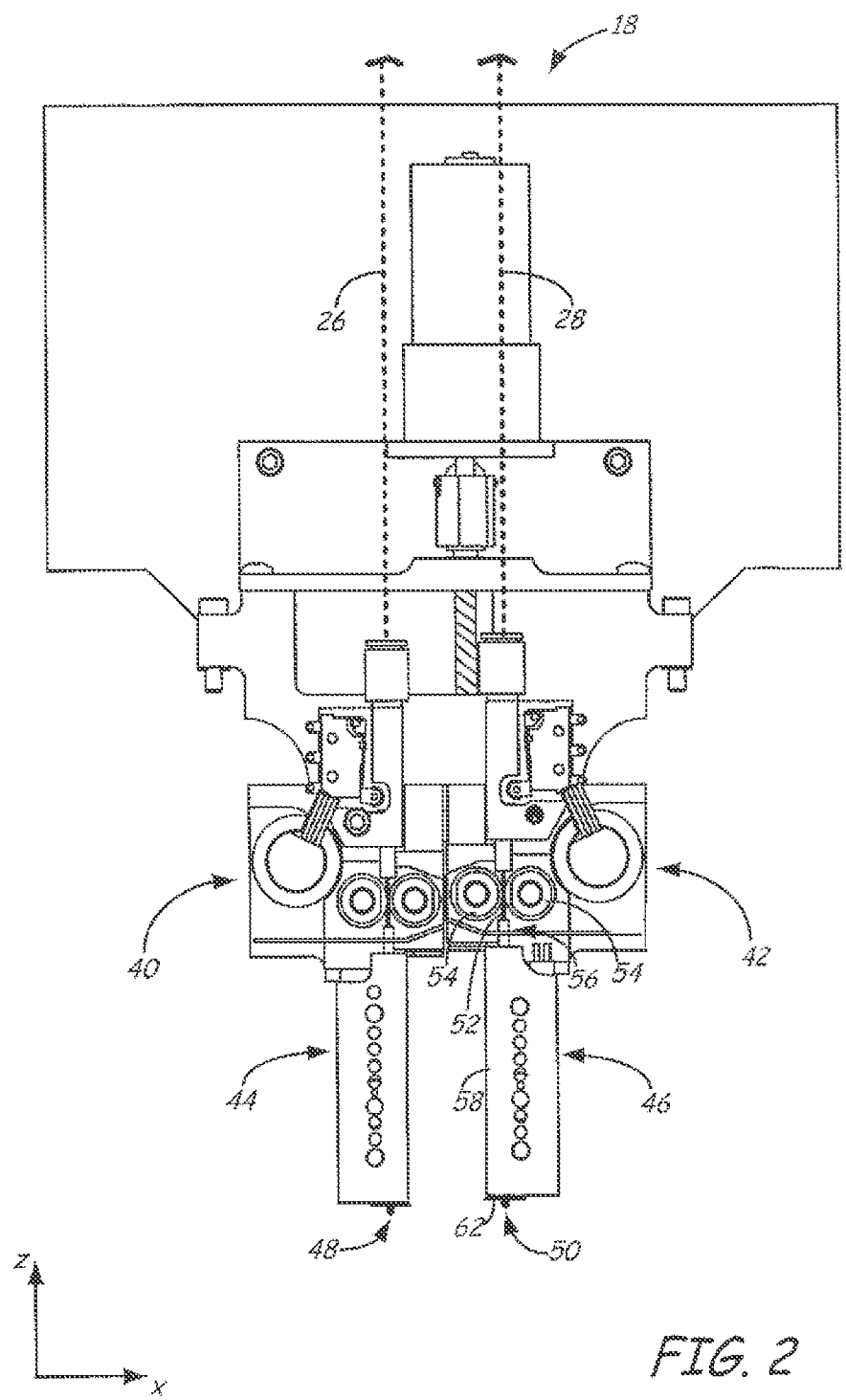
FIG. 2 is a front view of a print head of the extrusion-based additive manufacturing system.

FIG. 2 illustrates a suitable dual-tip device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; and Swanson et al., U.S. Pat. Nos. 8,419,996 and 8,647,102.

Figure 3:
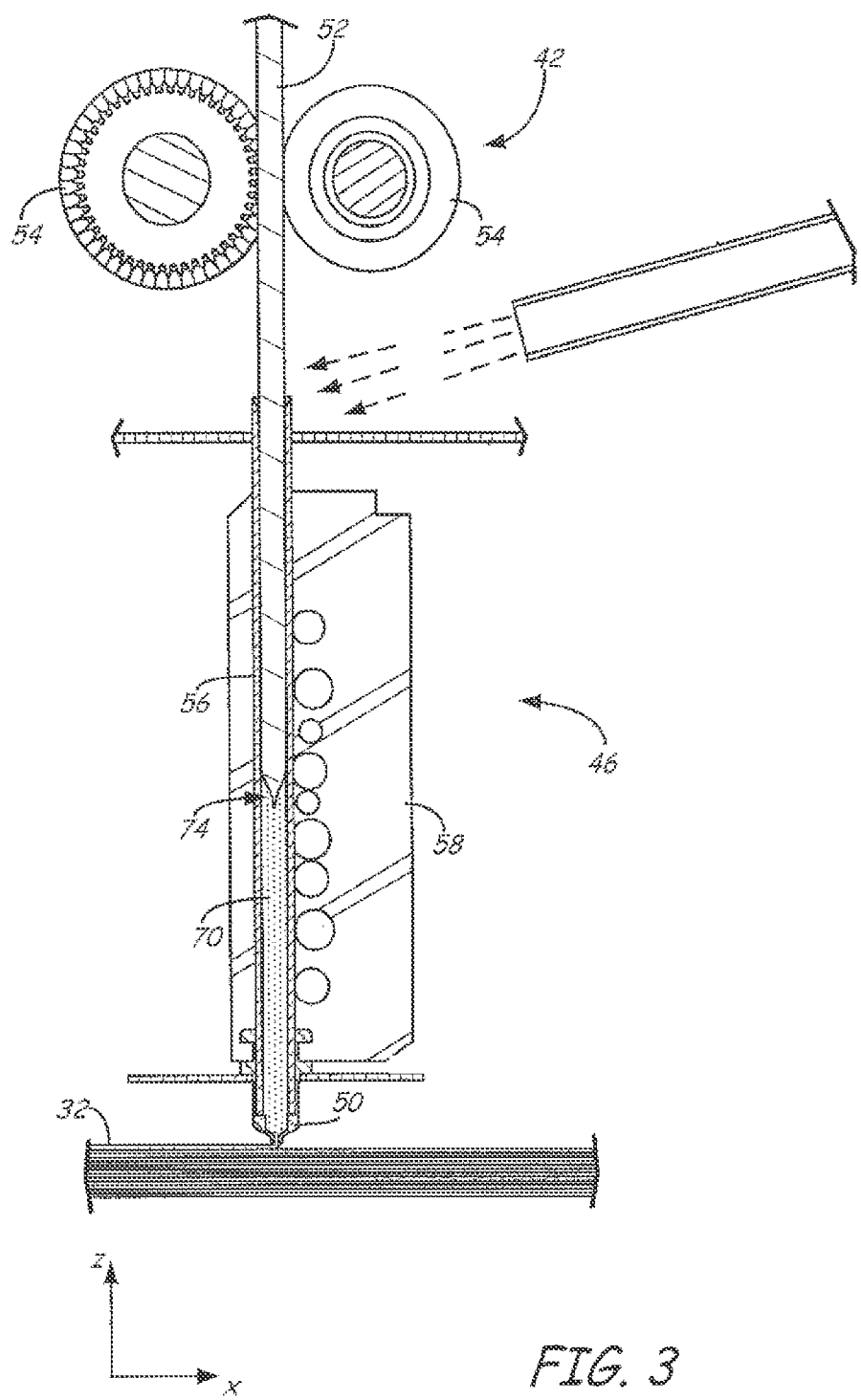
FIG. 3 is an expanded sectional view of a drive mechanism, a liquefier assembly, and a nozzle of the print head for use in the extrusion-based additive manufacturing system.

In the shown embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52. During operation, controller 34 may direct wheels 54 of drive mechanism 42 to selectively draw successive filament segments 52 (of the support material) from consumable assembly 24 (via guide tube 28 ), and feed filament segments 52 to liquefier assembly 46. In alternative embodiments, the consumable material may be provided in other geometries or formats adapted for other types of print heads and feed systems, such as powder, liquid, pellet, slug, or ribbon forms.

Liquefier assembly 46 is heated to melt the provided consumable material to form melt 70. Preferred liquefier temperatures will vary depending on the particular polymer composition of the consumable material, and are preferably above the melt processing temperature of the material. The molten portion of the material (i.e., melt 70 ) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads, to thereby print support structure 32 in a layer-by-layer manner in coordination with the printing of printed 3D part 30. After the print operation is complete, the resulting printed 3D part 30 and support structure 32 may be removed from the platen 14. Support structure 32 formed from a water dispersible sulfo-polymer material may then be dissolved from printed 3D part 30, such as by immersion in tap water.

The compositions of the present invention may also be provided in powder form for use in additive manufacturing systems that use powder-based consumables, e.g., electrophotography-based additive manufacturing systems and selective laser sintering systems. Electrophotography-based additive manufacturing systems are disclosed, for example, in Hanson et al., U.S. Pat. Nos. 8,879,957 and 9,423,756, and Comb et al., U.S. Publication Nos. 2013/0186549 and 2013/0186558. Such EP-based systems utilize charged particle materials, referred to as toner powder materials, for printing 3D parts and support structures. Toner powder materials for use in EP-based AM systems have a particle size distribution ranging from about 5 micrometers to about 50 micrometers, and include a charge control agent. The addition of a charge control agent to polymer powders for EP-based systems is disclosed in Orrock et al., U.S. Pat. No. 9,523,934, the disclosure of which is incorporated by reference to the extent that it does not conflict with the present disclosure.

In an exemplary electrophotography-based additive manufacturing system, each layer may be developed using electrophotography and carried from an electrophotography (EP) engine by a transfer medium (e.g., a rotatable belt or drum). The layer includes part material and support material. The layer of part and/or support material is transferred from the transfer medium to a build platform to print the 3D part (and support structure) in a layer-by-layer manner by applying heat and pressure, where the successive layers are transfused together on the build platform to produce the 3D part (and its support structure). The support structure formed from a water dispersible sulfo-polymer material may then be dissolved from the printed 3D part, such as by immersion in tap water.

Once dissolved in the water, the water dispersible sulfonated polymer maybe recovered from the water using conventional separation techniques such as filtration, centrifugation, evaporation, sedimentation, or the like, and combinations thereof. The recovered sulfonated polymer material may then be reformed and reused in a subsequent additive manufacturing process. The subsequent additive manufacturing process maybe fused deposition modeling, ink jetting, selective laser sintering, powder/binder jetting, electron-beam melting, electrophotographic imaging, or stereolithographic processes. Since the water dispersible sulfonated polymer is utilized to form a support structure which is a sacrificial structural component, some degradation of the water dispersible sulfonated polymer in a subsequent heat cycle to form subsequent support structures may be tolerated as long as the water dispersible sulfonated polymer has sufficient integrity to act as a support structure for the subsequent part being made.

More specifically, after an additive manufacturing part utilizing the water dispersible polymer is fabricated, the part and support material is dissolved in tap water for removal of the supports (support material). A dispersion is thereby created wherein the sulfonated polymer is floating within the removal water. To separate the sulfonated polymer material from the water for reuse as a water soluble consumable material in subsequent additive processes, the ionic strength of the dispersion is modified to precipitate the material from the water. The ionic strength of the dispersed solution may be increased using a salt, for example, NaCl or KCl, at an exemplary concentration of 1-10 grams/L, to precipitate the water dispersible polymer from the water solution. Once the material is precipitated out, one or more of the conventional techniques from recovering solids from a liquid can be utilized to recover the sulfonated polymermaterial. The recovered material can then be dried and formed for reuse as a raw material to fabricate additional consumable material configurations.

Traditionally, support material is not tap water soluble/dispersible, and the support material particulate is wetted with chemicals which would need further cleaning, processing or reaction to minimally consider reusing the support material in the additive manufacturing process. Utilizing the water dispersible support materials, no additional additives need to be added to the water to disperse the support material, and thus, the removed support material is riot tainted with other compounds; it simply needs to be dried to remove the water. Since the recovered support material has not changed in composition, the support material can be reintroduced into the manufacturing process as a pure support material at 100% purity again, once it has been dehumidified to remove moisture.

The dried, removed support particulate may be subjected to heat and remelted and reprocessed into a form suitable for subsequent use as a consumable feedstock in a subsequent additive manufacturing process. For example, the recycled sulfa-polymer material may be configured into a solid filament, ribbon, pellets or powdered toner format, such was done with the original virgin support material, and can be printed as a structural component in a subsequent process and dissolved once again in tap water without issue. In the fused deposition modeling category, previously processed materials have never been reintroduced into the raw material stream at a 100% feed capability after initial use, both because of the format after separation from the part (randomly shaped broken pieces), as well as the risk of the support material being tainted with the traditional chemicals used to remove support material from the part.

In the selective laser sintering/selective laser melting (SLS/SLM) space, a powder bed is subjected to laser heating, and portions of the powder bed contacted by the laser become fused to make a solid part. The remaining unfused powder in a powder bed is referred to as being 'recyclable' (collectable) for future use in subsequent powder beds after a finished part is removed from the bed; however the unfused powder has undergone a thermal history and cannot be used at a 100% recycle level, so it is blended back as a fraction of a subsequent powder bed. Chemically, it is untainted with other processing ingredients, such as those used in fused deposition modeling traditional support tank solutions. With respect to this invention, water dispersible sulfonated polymer support materials can be used at a 100% recycle usage level, without further chemical processing.

In addition to easy dispersibility (removal from the part being made) using just tap water, the support materials of this disclosure also allow for much quicker dissolution than previously encountered with other non-tap water dissolvable support material types. The sulfo-polymer supports can be removed in a matter of minutes (support material being approximately 50 mils thick, in less than approximately 5 minutes using heated water at approximately 70 C), compared to previous support material removal taking hours in harsh pH modified chemical bath solutions. Even using unheated water, the removal/dissolution time of the water dispersible polymer of this disclosure can be done in about 30 minutes, which is still significantly faster than removal using chemically modified bath solutions. At other support structure geometries and thicknesses, dissolution may vary. For instance, a dissolution time of approximately 15 minutes or less may be achieved at temperatures above ambient.

A part was printed using a Stratasys F123™ series printer, utilizing acrylonitrile butadiene styrene (ABS) filament for part printing, and sulfo-polyamide filament for the support printing. After completion of the part, the part and supporting structure were placed in a heated and agitated support removal tank (filled with 1 Liter of tap water, at 70 C, which was enough to cover the fabricated 3D part). In this example, a Wavewash 55™ support removal tank from Stratasys Inc. Optionally, a heated pot of water on a stove would also have been satisfactory. Instead of using a chemical solution as is typically provided for use in a typical Wavewash 55™ solution tank system, only tap water is used, and heated. The agitation system of the Wavewash™ tank was beneficial in accelerating the removal process. Traditional support removals using a chemical bath have used a standard 8 hour cycle time. The part was placed in the bath for approximately 10 minutes, until the support material was visually dispersed and supports were no longer visible as large particulates. The part was then removed from the tank. After removal, 10 grams of NaCl (table salt) was added to the tank, and after the NaCl has dissolved, the polysulfone particles begin to settle to the bottom of the tank, for subsequent collection. The water was decanted off and the precipitate filtered, to collect the sulfo-polyamide particulates, using a laboratory vacuum filtration funnel and receiver flask. The resulting sulfo-polyamide particulate cake was removed, placed on a metal tray, and dried in a controlled moisture lab vacuum oven (Fischer Scientific lab oven) at approximately 90 C for 3 hours. The subsequent dried cake was remelted into filament feedstock at 100%, using a process as described in Stratasys U.S. Pat. No. 7,122,246. Alternatively, it could have been refabricated into toner particles for use in 3D electrophotography, such as toners described in Stratasys U.S. Pat. No. 9,557,661.

It is believed that an important characteristic of the sulfopolymers of this disclosure is "charge density". Cationic and anionic polymers are characterized by their charge density. An anionic polymer is a polymer containing groups reasonably anticipated to become anionic. Charge density is usually expressed in milliequivalents (meq) of ionic groups per gram of polymer. Suitable charge densities for sulfopolymers of this disclosure are in the approximate range of (0.4 to 0.9 meq/g). Suitable charge densities are also those that for any particular sulfopolymer provide a water dispersibility characteristic to that sulfopolymer. As one example, sulfopolyesters with high charge densities are more easily and quickly dispersed in water, lending themselves to faster manufacturing removal. Lower charge densities may produce polymers that are resistant to water dispersibility. Higher charge density relating to better dispersibility in water is believed to be also a characteristic of other anionic polymers as anionic polymers are defined herein.

As mentioned above, the water dispersible material of the present disclosure compositionally comprises a sulfonated polymer. Such sulfo-polymers may be the reaction product of a condensation-type polymeric reaction or the reaction product of an addition-type polymer reaction.

Condensation-Type Sulfo-Polymers:

Condensation-type sulfonated polymers according to the present invention include but are not limited to sulfopolyesters, sulfopolyamides, sulfopolyurethanes, and blends thereof. The use of a sodium or lithium salt of isophthalic acid such as 5-sodiosulfoisophthalic acid (5-SSIPA) (CAS #6362-79-4) or derivatives thereof as a monomer in the synthesis of a sulfopolymer has been found to be suitable as a consumable material for use in additive manufacturing. In addition, the inclusion of 5-SSIPA as a monomer provides a suitable charge density to that polymer if added in an amount sufficient to provide water dispersibility. 5-SSIPA can be used as a monomer in producing condensation polymers including but not limited to sulfopolyesters, sulfopolyamides, sulfopolyesteramides, sulfopolyurethanes and blends thereof results in sulfopolymers that exhibit water solubility and/or dispersibility. Sulfonation of other polymer categories such as polystyrene, polyvinyl acetate, polyvinyl chloride, polyacrylates, polyvinylidine chloride, polyimides, polyarylsulfones, polycarbonates, including copolymers or admixtures thereof are also contemplated. The use of other sulfonated aromatic diacid or diol monomers in the synthesis of a sulfopolymer is contemplated to be useful as a water dispersible 3D printing material within this disclosure. Preferably, the polymer contains approximately 18 to 40% sulfoisophthalic monomer, with a more preferred range of approximately 20 to 35% sulfoisophthalic monomer and most preferably approximately 25 to 35% sulfoisophthalic monomer. Examples of the sulfoisophthalic monomer may include but are not limited to sodiosulfoisophthalic monomers.

Sulfo-Polyesters

Water dispersible sulfo-polyesters having a glass transition temperature of greater than 100° C. can be prepared and are described in U.S. Pat. No. 5,369,210, which is hereby incorporated by reference in its entirety. Sulfo-polyesters having a Tg in the approximate range of 105 to 120 C are suitable support materials for ABS part material.

The sulfo-polyesters of this disclosure may have a dicarboxylic acid component of poly(ethylene-2,6-naphthalene dicarboxylate) and a sulfo-monomer, and a diol component selected from ethylene glycol, diethylene glycol, 1,4-cyclohexanedimethanol, propane-1,2-diol and 2,2-dimethyl-1,3-propanediol. The diol component may also include bisphenol A (BpA) and/or other diphenylmethanederivatives and bisphenols with two hydroxyphenyl groups to effect higher Tgs in the polymer. Preferably, the sulfo-monomer is 5-sodiosulfoisophthalic acid (CAS #6362-79-4), or derivatives thereof. Other metallic sulfo-monomers are additionally contemplated.

The sulfo-polyester contains repeat units from a dicarboxylic acid and a difunctional sulfomonomer, and a diol. Dicarboxylic acids useful in the present invention include naphthalene dicarboxylic acid or naphthalene dicarboxylate ester such as naphthalene-2,6-dicarboxylic acid. The naphthalene dicarboxylate monomer may be in the form of the free-acid or esterified derivatives thereof. Preferably, the dimethyl ester forms are used which have the following structures:

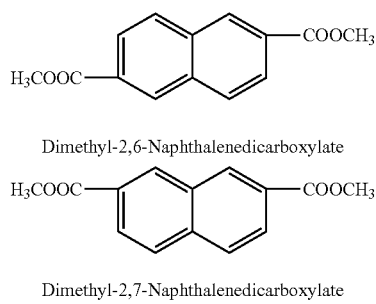

Dimethyl-2,6-Naphthalenedicarboxylate

Dimethyl-2,7-Naphthalenedicarboxylate

Isomeric arrangement of the carboxylate groups on the naphthalene substrate is an important consideration to the practice of this invention. High Tg polyester resins are readily obtained when each of the aromatic rings bears one of the carboxyl(ate) groups.

In one embodiment, the sulfopolyester contains repeat units from at least two dicarboxylic acids, a diol, and a difunctional sulfomonomer. At least one of the dicarboxylic acids, component (a), is 10 to 93 mole percent based on 100 mole % dicarboxylic acid component, of naphthalene-2,6-dicarboxylic acid, naphthalene-2,7-dicarboxylic acid, naphthalene-2,6-dicarboxylate ester, or naphthalene-2,7-dicarboxylate ester. Preferably, the dimethyl ester forms are used.

in addition to the 2,6- or 2,7-naphthalene dicarboxylic acid or 2,6- or 2,7-dicarboxylic ester, the dicarboxylic acid component contains 2 to 85 mole percent of a dicarboxylic acid, component (b), which is selected from aliphatic, alicyclic, and aromatic dicarboxylic acids. Examples of these dicarboxylic acids include malonic, dimethylmalonic, succinic, dodecanedioic, glutaric, adipic, trimethyladipic, pimelic, 2,2-dimethylglutaric, azelaic, sebacic, fumaric, suberic, maleic, itaconic, 1,3-cyclopentane dicarboxylic, 1,2-cyclohexanedicarboxylic, 1,3-cyclohexanedicarboxylic, 1,4-cyclohexanedicarboxylic, terephthalic, isophthalic, 2,5-norbomanedicarboxylic, diphenic, 4,4'-oxydibenzoic, diglycolic, thiodipropionic, 4,4'-sulfonyldibenzoic, 1,8-naphthalenedicarboxylic, and 2,5-naphthalenedicarboxylic. The anhydride, acid chloride, and ester derivatives of the above acids may also be used. The preferred dicarboxylic acid(s) to be used along with naphthalene dicarboxylic acid or naphthalene dicarboxylate ester are isophthalic acid, terephthalic acid, dimethyl terephthalate, and dimethyl isophthalate.

One aspect of this invention concerns the amount of 2,6- or 2,7-naphthalenediyl modification necessary for a given dicarboxylic acid or dicarboxylic acid combination to result in a polymer having a Tg above 89° C. In general, the amount of 2,6- or 2,7-naphthalenediyl modification will decrease in the order: aliphatic>cycloaliphatic>aromatic. Increasing the chain length of an aliphatic acid will result in a corresponding decrease in Tg, thus, requiring a higher level of naphthalenic modification.

The difunctional sulfomonomer component of the polyester may be a dicarboxylic acid or an ester thereof containing a metal sulfonate group (—SO3-), a diol containing a metal sulfonate group, or a hydroxy acid containing a metal sulfonate group. Suitable metal cations of the sulfonate salt may be Na+, Li+, K+, Mg++, Ca++, Ni++, Fe++, Fe+++, Zn++ and substituted ammonium. The term "substituted ammonium" refers to ammonium substituted with an alkyl or hydroxy alkyl radical having 1 to 4 carbon atoms. It is within the scope of this invention that the sulfonate salt is non-metallic and can be a nitrogenous base as described in U.S. Pat. No. 4,304,901.

The choice of cation will influence the water dispersibility of the resulting polyester. Monovalent alkali metal ions yield polyesters that are less readily dissipated by cold water and more readily dissipated by hot water, while divalent and trivalent metal ions result in polyesters that are not ordinarily easily dissipated by cold water but are more readily dispersed in hot water. It is possible to prepare the sulfopolyester using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more water soluble in the polymer manufacturing components than are the divalent metal salts. Polymers containing divalent and trivalent metal ions are normally less elastic and rubber-like than polymers containing monovalent ions.

Sulfopolyesters are more easily dispersed in water and/or form smaller aggregates in dispersion if the sulfopolyester has a high charge density. Cationic and anionic polymers are characterized by their charge density usually expressed in milliequivalents (meq) of anionic or cationic groups per gram of polymer. Charge densities of sulfopolyesters suitable in this disclosure are in the approximate range of at least approximately 0.4 meq. and up to approximately to 0.9 meq/g.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Examples of sulfomonomers include sulfophthalic acid, sulfoterephthalic acid, sulfoisophthalic acid, 5-sodiosulfoisophthalic acid, 4-sulfonaphthalene-2,7-dicarboxylic acid, and their esters. Metallosulfoaryl sulfonate which is described in U.S. Pat. No. 3,779,993, may also be used as a sulfomonomer.

The sulfomonomer is present in an amount sufficient to provide water dispersibility to the sulfo-polyester. Preferably, the sulfomonomer is present in an amount of from 15 to 40 mole percent, more preferably 15 to 25 mole percent, based on the sum of the moles of total dicarboxylic acid content. In one example approximately 20 mole percent was found suitable.

The diol component of the polyester can be ethylene glycol, diethylene glycol, propane-1,2-diol, 1,4-cyclohexanedimethanol or 2,2-dimethyl-1,3-propanediol. The diol component may also include mixtures of the above diols. In addition, the diol component may include a sufficient amount of other cycloaliphatic or aromatic diols to suitably increase the Tg of the polymer. Included within the class of aliphatic diols are aliphatic diols having ether linkages such as polydiols having 4 to 800 carbon atoms. Aromatic diols include bisphenol A (BpA) and/or other diphenylmethanederivatives and bisphenols with two hydroxyphenyl groups. Examples of additional diols are: diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis -(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The diol component of the polyester may also contain a diol selected from ethylene glycol, propane-1,2-diol, propane-1,3-diol, 1,4-cyclohexanedimethanol and 2,2-dimethyl-1,3-propanediol.

The particular combination of diols is stipulated only by the requirements that the final product possess a Tg equal to or greater than 45° C. while maintaining water dispersibility. Semi-crystalline and amorphous materials are within the scope of the present invention, although in most applications amorphous materials are contemplated. It is to be understood that the sulfo-polyesters of this invention contain substantially equal molar proportions of acid equivalents (100 mole %) to hydroxy equivalents (100 mole %). Thus, the sulfo-polyester comprised of components (a), (b), and (c) will have a total of acid and hydroxyl equivalents equal to 200 mole percent. The sulfo-polyesters have an inherent viscosity of 0.1 to 1.0 dl/g, preferably 0.2 to 0.6 dl/g.

A buffer may be added to the compositions of the present invention. Buffers and their use are well known in the art and do not require extensive discussions. Suitable buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer. In one embodiment, the buffer is present in an amount of about 0.1 moles per mole of difunctional sulfomonomer.

An aspect of this disclosure concerns the effect of diol chain length on the Tg of the resulting product. The structures: HO—(OCH2-CH2)n-OH and HO—CH2-(CH2)n-OH refer to the homologous series' of diols that are derived from ethylene and oxyethylene (i.e. diethylene) glycol. Values of n for the example based on ethylene glycol are normally in the range from 1 to 12. As n increases the Tg for a resulting homopolyester resin is decreased accordingly. Therefore, modification of essentially a sulfonate-containing poly(ethylene naphthalene dicarboxylate) requires proportionately smaller molar amounts of codiol as n increases. A similar trend is observed when n increases from one (diethylene glycol) to about 10 for oxyethylene glycols.

In the case of high molecular weight oxyethylene glycol, also referred to as poly(ethylene glycol) or PEG, the value of n will be at least 10, preferably about 20, which translates into a PEG monomer molecular weight of at least 500, preferably around 1000. Typically less than 10 mole percent of PEG incorporation, based on total diol, will be used since a Tg of greater than approximately 45° C. is required. One advantage of high molecular weight PEG modification is the ability to attain higher molecular weights without losing water dispersibility. It is important to note that high sulfomonomer levels result in high process melt viscosities which limit the molecular weight attainable in the melt phase. A low molecular weight determined by an inherent viscosity measurement of less than 0.1 dl/g may result in poor physical properties such as low Tg and inadequate tensile strength.

The sulfo-polyesters can be prepared by conventional polycondensation procedures well-known in the art. Such processes include direct condensation of the acid with the diol or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of naphthalene dicarboxylate.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

Sulfo-Polyamides

The sulfo-polyamides of this disclosure are amorphous and dispersible in an aqueous solution. Amorphous (transparent) polyamides are described in U.S. Pat. Nos. 2,696,482 and 3,296,204, wherein each patent is hereby incorporated by reference in its entirety. The transparent nature of the polyamide is obtained by using isophthalic acid (instead of terephthalic acid) as a reactant with a diamine to obtain the amorphous nature of the polyamide.

One example of such a transparent sulfo-polyamide obtained by polycondensation of bis-(4-amino cyclohexy) methane, at least one aromatic dicarboxylic acid and e-caprolactam, with a relative solution viscosity of at least 1.5 consisting of (1) from to 35% by weight of equimolar quantities of amino units (a) of the general formula and of aromatic dicarboxylic acid units (b) of the general formula t 1 L 0 or 0 and (2) from 30 to 65 by weight of lactam units (c) of the general formula. Particularly preferred copolyamides according to the invention are copolyamides consisting of from 60 to 70% by weight of equimolar quantities of units a) and of isophthalic acid units from 30 to 40% by weight of units (c).

In one embodiment, polyamides are prepared by employing as one of the reactants a sulfonated aromatic dicarboxylic acid. Suitable sulfonated aromatic dicarboxylic acids include those having the structural formulas

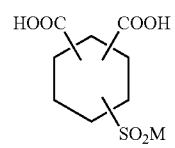

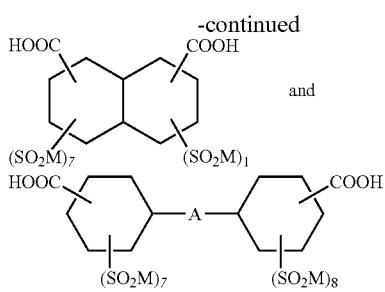

and

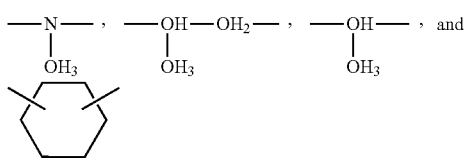

In the above structural formulas M is an alkali metal such potassium, sodium lithium and cesium; A represents a direct bond or divalent radical selected from the group consisting of —O—, —CH2-CH2-, —O—CH2-CH2-O—, —SO2-, —S—, —CF2-, —C(CH3)2-, $$-\underset{\mathrm{CH}_3}{\mathrm{N}}-,\ -\underset{\mathrm{CH}_3}{\mathrm{CH}}-\mathrm{CH}_2-,\ -\underset{\mathrm{CH}_3}{\mathrm{CH}}-,\ \text{and}$$

And y and z are 0 or 1, the sum of y and z being at least 1.

It will be understood that, in the above structural formulas, any or all of the hydrogens in the carboxyl groups (—COOH) can be replaced with alkyl groups, usually the lower alkyl groups, and the —OH of the carboxyl groups can be replaced by a halogen such as chlorine. Thus, the polyamide: of this invention can be prepared by employing the lower alkyl esters and the acid chlorides of the above compounds.

The polyamides of this invention will contain in their molecular formula recurring structural units of the general structure

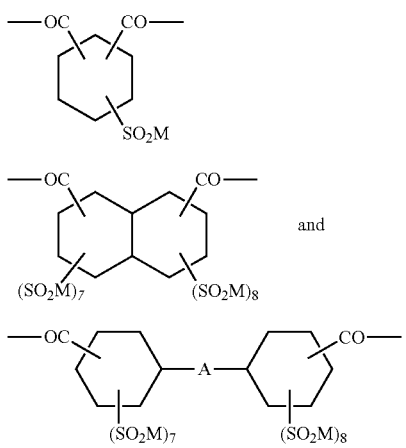

Wherein M, A, y and z are as previously defined.

In carrying out this invention the sulfonated aromatic dicarboxylic acid can be employed in varying amounts. It has been determined, however, that amounts sufficient to provide a polyamide containing the above recurring structural units in amounts of from about 5 to 50 mole percent, with about 15 to 25 mole present being preferred, can be employed. In general, the proportions of the respective recurring units in the polyamide will be found to be approximately the same as the mole proportions of the reactants.

Examples of sulfonated aromatic dicarboxylic acids that can be employed in carrying out this invention include the following:

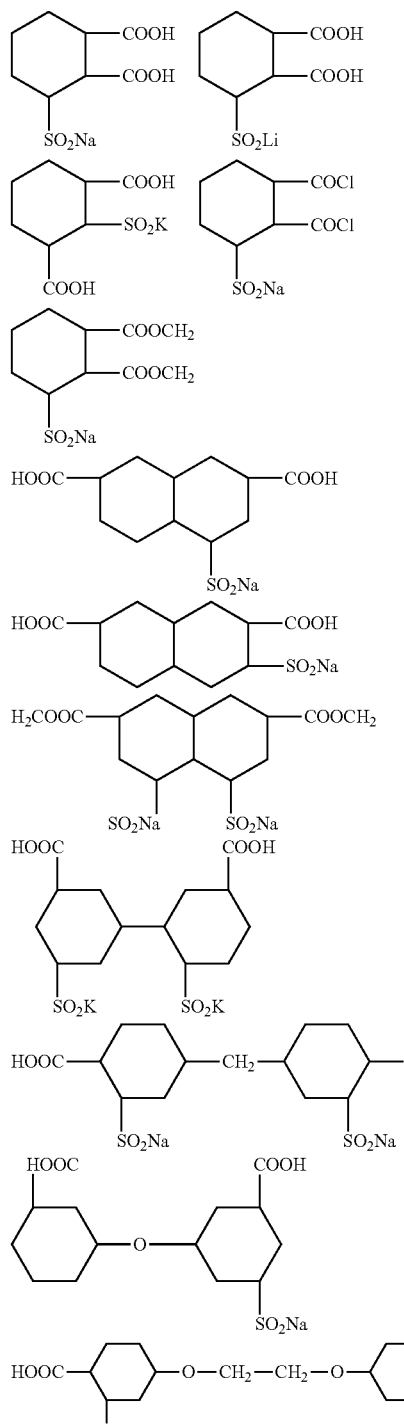

and

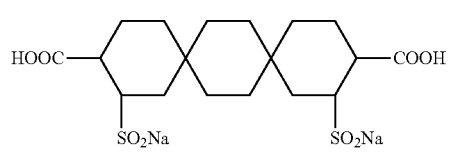

The other reactants employed in this invention are well known polyamide forming compounds and include various amino acids having the general formula

H2N—R—COOH wherein R is selected from the group consisting of a divalent aliphatic radical, either straight or branched chain; a divalent alicyclic radical; and a divalent aromatic radical. If amino acids are employed, the polyamide will be comprised of, in addition to at least one of the recurring units I, II, and III, recurring units of the general structure

—HN—R1-CO—  IV wherein R is as previously defined.

Also salts of various dicarboxylic acids and diamines represented by the structural formulas

HOOC—R1-COOH and

H2N R2-NH2 can be employed in the preparation of the polyamides of this invention. In the above formulas R is selected from the group consisting of divalent aliphatic radicals, either straight or branched chain: divalent alicyclic radicals; and divalent non-sulfonated aromatic radicals. R2 is selected from the group consisting of divalent aliphatic radicals, either straight or branched chain; divalent alicyclic radicals; and divalent aromatic radicals. Polyamides prepared from the above salts will be comprised of, in addition to at least one of the structural units I, II, and recurring units of the general structure

—HN—R2-NH—CO—R1-CO—  V wherein R and R are as above defined.

Instead of using the salt of the above defined diamines and dicarboxylic acids, the polyamides can be prepared by a condensation reaction from a mixture of a diamine, as above defined, a dicarboxylic acid, as above defined, and a sulfonated aromatic dicarboxylic acid. Thus, for example, a mixture of the above compounds can be heated in a suitable reaction vessel, in an inert atmosphere, at a temperature of from about 200 C. to 280C. for about 2 to 4 hours, or longer depending on the viscosity desired of the resulting polyamide. The reaction can be conveniently carried out in aqueous media or in a suitable solvent such as cresol, xylenol, o-hydroxydiphenyl, and the like. It is preferred, however, to employ the salt of the diamine and dicarboxylic acid.

In a preferred method of preparing the polyamides a salt of the sulfonated aromatic dicarboxylic acid and a diamine is first prepared. Suitable diamines for this purpose include any of those set forth hereinabove for use in preparing salts of a diamine and the defined dicarboxylic acid. The salt can be conveniently produced by dissolving substantially equimolar proportions of the diamine and the sulfonated aromatic dicarboxylic acid in water and subsequently pouring the solution into a nonsolvent for the formed salt, such as ethanol, wherein the salt precipitates out.

The diamine-sulfonated aromatic dicarboxylic acid salt is then reacted with (i) an amino acid, as above defined, or (2) a diamine-dicarboxylic acid salt, as above defined to produce the polyamides. Known polyamide forming methods can be employed. It is preferred, however, to prepare a mixture of the above ingredients and heat the mixture in an inert atmosphere at a temperature of from about 230 C. to 260' C. for about 1 hour to 2 hours to form a low molecular weight polymer, a prepolymer. The reaction is carried out in aqueous media or in a solvent such as cresol, xylenol, or o-hydroxydiphenyl. The prepolymer is then heated and stirred, in its molten form, at a temperature of from about 240 C to 300 C. for about 1 hour to 3 hours, or longer to produce a polyamide of desired viscosity. Alternatively, the prepolymer can be solidified and ground to particle size, particles of a cross-sectional diameter of about 0.03 inch or smaller being satisfactory. The particles are subsequently heated in a vacuum or in an inert atmosphere at 10 C. to 50 C below their melting point for about 2 to 4 hours. Under these conditions, the polymer can be built up to a relatively high viscosity.

Amino acids that can be used in carrying out this invention include straight chain aliphatic amino acids having the structural formula wherein n represents an integer of 5 through 10 branched chain aliphatic amino acids of the same range of carbon atoms as the straight chain aliphatic amino acids, alicyclic amino acids, and aromatic amino acids.

Specific examples of amino acids include S-amino-n-valeric acid, G-amino-n-caproic acid, 7-amino-n-heptanoic acid, 1,2-amino-n-dodecanoic acid, 3-methyl-6-amino-hexanoic acid, 4,4-dimethyl-7-aminoheptanoic acid 4-ethyl-6-amino-hexanoic acid, 4-aminocyclohexanecarboxylic acid, 3-aminomethylcyclohexanecarboxylic acid, 4-aminoethylcyclohexanecarboxylic acid, 4-aminomethylcyclohexanecarboxylic acid, 4-carboxypiperidine, α-amino-p-toluic acid, α-amino-m-toluic acid, 5-aminonorcamphane-2-carboxylic acid, and 5-aminomethylnorcamphane-2-carboxylic acid.

As set forth hereinabove various salts of certain dicarboxylic acids and diamines can be employed as one of the reactants in preparing the polyamides.

Dicarboxylic acids suitable for this purpose include aliphatic dicarboxylic acids containing from 4 to 12 carbon atoms between the carboxyl groups, either straight or branched chains, non-sulfonated aromatic dicarboxylic acids, and alicyclic dicarboxylic acids.

Specific examples of aliphatic dicarboxylic acids include oxalic acid, dimethylmalonic acid, succinic acid, glutaric acid, adipic acid, 2-methyladipic acid, 3-ethyladipic acid, pimelic acid, azelaic acid, suberic acid, sebacic acid, 3-ethylsebacic acid, and dodecanedioic acid.

Specific examples of alicyclic dicarboxylic acids include 1,1-cyclohexanedicarboxylic acid, 1,2-cyclohexanedicarboxyiic acid, 1,3-cyclohexanedicarboxyllic acid, and 1,4-cyclohexanedicarboxylic acid. The transisomer of the above acids is preferred; however, the cis isomer or mixtures of the two can be employed if desired. Other suitable alicyclic dicarboxylic acids include norcamphane-2,'5- dicarboxylic acid; norcamphane-2,6-dicarboxylic acid, and

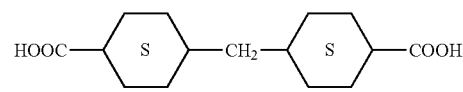

Non-sulfonated aromatic dicarboxylic acids include phthalic acid, isophthalic acid, terephthalic acid, and the halogenated derivatives of these acids. Other suitable aromatic dicarboxylic acids include those acids having the structural formula

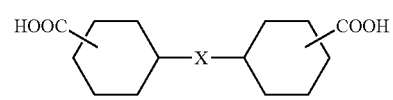

Wherein X can be, for example, a direct bond, —O—, —S—, —SO2-, —CH2-, —CH2-CH2, —CH2-CH2-CH2, —CH2-CH2-CH2-CH2-, —O—C2H4-O—, —C(CH3)2-,

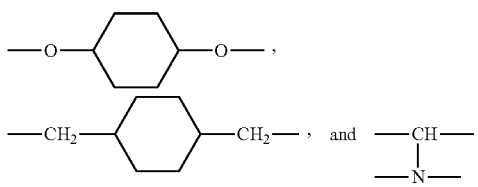

Acids containing one or more ether groups in the molecular chain as represented by ethylenedioxydiacetic acid, 4,4'-oxydibutyric acid, and 3,3'-oxydipropionic acid can be employed.

Suitable diamines for use in preparing the above-mentioned salt include aliphatic diamines containing 4 to 12 carbon atoms between the amino groups, either straight or branched chains, alicyclic diamines, and amines containing one or more aromatic nuclei.

Specific examples of aliphatic diamines include ethylene diamine, tetramethylenediamine, pentamethylenediamine, hexamethylenediamine, octamethylencdiamine, 1,12-diaminododecane, 2,2-dimethyl-1.5-diamlnopentane, 3,6-diethyl-1,8-diaminooctane, 2-methyl-1,3-diaminopropane, 3-ethyl-1,6-diamlnohexane, and 4-butyl-1,10-decamethyienediamine. Diamines containing one or both amino groups on a secondary carbon atom and diamines containing secondary amino groups can also be employed.

Examples of specific alicyclic diamines include 1,2-diaminocyclohexane, 1,3-diaminocyclohexane, 1,4-diaminocyclohexane, 1,1cyclohexanebis(methylamlne), 1,2 cyclohexanebis(methylamine), 1,3 cyclohexanebls(methylamine), and 1,4 cyclohexanebis(methylamine) These diamines can be used as the transisomer or use mixtures of cis and trans-isomers. Other suitable alicyclic diamines include 2,5 norcamphanediamine, 2,6 norcamphanediamine, 2,5 norcamphanebis(methylamine), and 2,6-norcamphanebis(methylamine). Diamines containing one or more aromatic nuclei include o-, m-, and p-xylene-∝, ∝-diamines, and 3,4'-dl-(aminomethyl)diphenyl.

Diamines containing ether groups such, for example,as 3,3 oxybis(propylamine), 3,3 (ethylenedioxy)bis (propylamine), and 3,3'-(2,2-dimethyltrimethylenedioxy) bis(propylamine) can be employed.

It is understood that the polyamides herein can be prepared by employing, in place of the above-defined acidic compounds, the lower alkyl esters thereof. The phenyl ester can also be employed if desired. Further, the acid chloride of the acidic compound can be employed in preparing polyamides of this invention if desired. This is usually accomplished in the presence of an acid-accepting agent.

In some instances it can be desirable to heat the sulfonated aromatic dicarboxylic acid with an excess of a diamine, usually about 25 mole percent to 45 mole percent, to provide a diamine that is terminated with amino groups. The dicarboxylic acid is then added in an amount molecularly equivalent to the excess diamine employed and the reaction is completed as above described.

Sulfo-Polyurethanes

Sulfo-polyurethanes of this disclosure are produced by reacting an isocyanate containing two or more isocyanate groups per molecule (R—(N═C═O)$_{n≥2}$) with a polyol containing on average two or more hydroxy groups per molecule (R'—(OH)$_{n≥2}$), in the presence of a catalyst or by activation with ultraviolet light.

The properties of polyurethane may be greatly influenced by the types of isocyanates and polyols used to make the polymer. In this disclosure, the polyurethane desired is a thermoplastic polyurethane (TPU), that is a polyurethane that has not been crosslinked.(although crosslinked polyurethanes have been contemplated). By thermoplastic is meant that the polyurethane does not soften or melt when heated. TPUs are typically formed by the reaction of (1) diisocyanates with short-chain diols (so-called chain extenders) and (2) diisocyanates with long-chain diols. The three reaction compounds allow for an enormous variety of different TPUs.

Typically, polyurethanes have a rather low Tg such as below 50 C. To increase the Tg to one suitable for a water dispersible 3D printing material for this disclosure, higher molecular weight molecules are added to the polymer. Such molecules may be added via the diisocyanate reactant. Such molecules include cyclo aliphatic or aromatic components. Cycloaliphatic isocyanates, such as isophorone diisocyanate (IPDI) are believed to be suitable to raise the Tg to levels of 100 C or greater. Aromatic isocyanates such as diphenylmethane diisocyanate (MDI) or toluene diisocyanate(TDI) are also believed to be suitable. Although specific aliphatic and aromatic diisocyanates have been mentioned herein, it is contemplated that other diisocyanates may also be used for the purposes described herein.

The 5-sodiosulfoisophthalic acid (5-SSIPA) component is introduced by conversion of the acid component to an isocynate or to a diol component. If converted to a diol component, the sodium salt can be substituted for the polyol needed to produce the polyurethane.

Alternatively a polyol component can be used having higher molecular groups such as the cycloaliphatics or aromatics discussed above and the sodiumsulfoisophthalic isocynate may be directly used in the production reaction to produce the polyurethane.

The following examples are included for illustrative purposes only and are not intended to limit the scope of this disclosure.

Examples of Condensation-Type Sulfo-Polymers:

The table set forth below associated polymers with a particular Tg, used to make parts, with water dispersible condensation-type sulfonated polymer types or combinations made under this disclosure having compatible Tgs.

| Part Material/Non-Water dispersible Polymers | Glass Transition Temperature (Tg) ° C. | |
| --- | --- | --- |
| Polylactic acid | 48 | |
| Acrylonitrile Butadiene Styrene | | |
| #1 | 123 | |
| #2 | | 120 |
| Polycarbonate | | |
| #1 | | 155 |
| #2 | | 155 |

| | Support Structure Water dispersible Polymer Compositions tested, having Compatible Tgs, % | | | | | | |
|---|---|---|---|---|---|---|---|
| | | | | | | | |

| | | | | | | | |
|---|---|---|---|---|---|---|---|
| Ultem 9085; polymer from Stratasys Ltd. of Eden Prairie, MN, USA | | | | | 185 | | |
| Ultem 1010; polymer from Stratasys Ltd. of Eden Prairie, MN, USA | | | | | | 225 | |
| Monomers | Polyester | Polyester | Polyester | Polyester | Polyester | Polyamide | Polyamide |
| Composition One: | | | | | | | |
| Ethylene glycol | | 100 | 100 | 100 | 100 | | |
| Composition Two: | | | | | | | |
| Diethylene glycol | 75 | | | | | | |
| 1,4-Cyclohexyldimethanol | 25 | | | | | | |
| Composition Three Variations: | | | | | | | |
| Dimethyl napthalene dicarboxylic acid | | 60 | 60 | 50 | 60 | | |
| Adipic acid | | 5 | | | | | |
| Succinic acid | | | 10 | 10 | 5 | | |
| Dimethyl 5-sodiosulphoisophthalic acid | | 35 | 30 | 40 | 35 | | |
| Composition Four Variations: | | | | | | | |
| 5-sodiosulphoisophthalic acid | 24 | | | | | 30 | |
| Terephthalic acid | | | | | | 35 | |
| Isophthalic acid | 76 | | | | | 35 | |
| Composition Five: | | | | | | | |
| Hexamethyldiamine | | | | | | 100 | |
| Composition Six: | | | | | | | |
| 4,4'-methylenebis(2-methylcyclohexylamine) | | | | | | | 36 |
| Laurolactam | | | | | | | 28 |
| Isophthalic acid | | | | | | | 6 |
| 5-sodiosulphoisophthalic acid | | | | | | | 30 |

Addition-Type Sulfo-Polymers:

As mentioned above, the water dispersible material of the present disclosure compositionally may also comprise a sulfonated polymer formed by addition polymerization.

Salts of sulfonated polystyrene and other addition type copolymers are specifically contemplated in this disclosure. The sulfonation occurs through the use of sulfonated monomer substituent group in the monomer. A particularly useful group of addition polymers are those that are derived from unsaturated vinyl monomers,

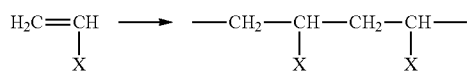

(Structure 1)

where X represents a functional group defining the particular polymer being produced. A non exhaustive list of such polymers includes polymers formed from styrene, methyl methacrylate, methyl acrylate, vinyl acetate, vinyl chloride, ethylene, polypropylene, α-olefins, isobutylene, dienes, vinyl chloride, vinylidene chloride, vinyl fluoride, tetrafluoroethylene, vinyl ethers, vinyl esters, acrylic and methacrylic esters, acrylonitrile and any combination of the previously mentioned monomers and their derivatives that are capable of forming copolymers.

Sulfonation of such additive polymers provides a mechanism for solubility. Of particular usefulness is sodium styrenesulfonate although lithium, magnesium, calcium, ammonium, or potassium sulfonates are also contemplated.

With regard to polystyrene specifically, sulfonation may occur using one or both of sodium p-styrenesulfonate or sodium styrenesulfonate, as long as polymerization occurs.

Sulfonated monomers may be reacted with monomers not containing a sulfonated group. It is contemplated that the resulting polymer may have 100% sulfonated monomer or some lower combination of sulfonate and not sulfonated monomer. In the case of styrene, the non sulfonated styrene polymer may be as much as about 65% mole ratio of the total polymeric component compared to the sulfonated styrene monomer. One suitable mixture is about a 50/50 mole ratio of sulfonated to non sulfonated monomer. The minimum amount of sulfonated monomer may depend on the functional monomer group itself, and where the minimum amount of sulfonated monomer is dictated by its water dispersibility. It is believed that approximately 18 to 40% sulfonated monomer or approximately 20 to 35% sulfonated monomer, or approximately 25 to 35% sulfonated monomer provides suitable water dispersibility.

One particular copolymer of interest is Poly(sodium 4-sulfostyrene-co-styrene) in a mole ratio of 35:65 with styrene, which results in a glass transition temperature (Tg) of approximately 110 C having a molecular weight of approximately 125,000. This copolymer is manufactured by Tosoh Organic Chemical (under designation ST-6510E) and is a good FDM support candidate for ABS, ASA, and PS as it is water-dispersible having excellent thermal stability and an appropriate Tg to the build material. The styrene content of the water dispersible polymer will enhance lamination strength to styrenic build materials. The adherence of this copolymer to ABS, ASA, and PS has been found to be better than condensation polymers.

Depending on the co-monomer, a suitable concentration of sodium 4-sulfostyrene is approximately 5-50 mol % to the co-monomer and preferably 15-35% mol % to the co-monomer. A typical molecular weight of this copolymer is approximately 100-200,000. Other additional copolymers can be used to increase Tg to extend utility to high temperature build materials such as polycarbonate; polysulfones, polyetherimides, and the like. Depending on co-monomers, concentration of sodium 4-sulfostyrene (NaSS): 5-50 mol %, preferably 15-35%. Typical Mw target: 50-200,000.

Examples of suitable comonomers include styrenes such as styrene, chlorostyrene, dichlorostyrene, bromostyrene, dibromostyrene, fluorostyrene, trifluorostyrene, nitrostyrene, cyanostyrene, α-methylstyrene, p-chloromethylstyrene, p-cyanostyrene, p-amino styrene, p-acetoxystyrene, p-styrenesulfonyl chloride, ethyl p-styrenesulfonyl, methyl p-styrenesulfonyl, propyl p-styrenesulfonyl, p-butoxystyrene, p-hydroxystyrene, 4-vinylbenzoic acid, 3-isopropenyl-α,α'-dimethylbenzyl isocyanate and vinylbenzyltrimethyl-ammonium chloride.

Vinyl ethers may also be comonomers and examples of suitable vinyl ethers include isobutyl vinyl ether, ethyl vinyl ether, 2-phenyl vinyl alkyl ether, nitrophenyl vinyl ether, cyanophenyl vinyl ether, chlorophenyl vinyl ether and chloroethyl vinyl ether.

Suitable acrylic acid esters may also be comonomers and some examples include methyl acrylate, ethyl acrylate, propyl acrylate, butyl acrylate, pentyl acrylate, hexyl acrylate, decyl acrylate, lauryl acrylate, octyl acrylate, dodecyl acrylate, stearylacrylate, 2-ethylhexylacrylate, cyclohexyl acrylate, bornyl acrylate, 2-ethoxyethyl acrylate, 2-butoxyethyl acrylate, 2-hydroxyethyl acrylate, tetrahydrofurfuryl acrylate, methoxyethylene glycol acrylate, ethylcatbitol acrylate, 2-hydroxypropyl acrylate, 4-hydroxybutyl acrylate, 3-(trimethoxysilyl)propyl acrylate, polyethylene glycol acrylate, glycidyl acrylate, 2-(acryloyloxy)ethyl phosphate, 2,2,3,3-tetrafluoropropyl acrylate, 2,2,2-trifluoroethyl acrylate, 2,2,3,3,3-pentafluoropropyl acrylate and 2,2,3,4,4,4-hexafluorobutyl acrylate, Examples of Methacrylic acid esters suitable as comonomers include methyl methacrylate, t-butyl methacrylate, sec-butyl methacrylate, i-butyl methacrylate, i-propyl methacrylate, decyl methacrylate, lauryl methacrylate, octyl methacrylate, dodecyl methacrylate, stearyl methacrylate, cyclohexyl methacrylate, bornyl methacrylate, benzyl methacrylate, phenyl methacrylate, glycidyl methacrylate, polyethylene glycol methacrylate, 2-hydroxyethyl methacrylate, tetrahydrofurfuryl methacrylate, methoxyethylene glycol methacrylate, ethylcarbitol methacrylate, 2-hydroxypropyl methacrylate, 4-hydroxybutyl methacrylate, 2-(methacryloyloxy)ethyl phosphate, 2-(dimethylamino)ethyl methacrylate, 2-(diethylamino)ethyl methacrylate, 3-(dimethylamino)propyl methacrylate, 2-(isocyanato)ethyl methacrylate, 2,4,6-tribromophenyl methacrylate, 2,2,3,3-tetralfluoropropyl methacrylate, 2,2,2-trifluoroethyl methacrylate, 2,2,3,3,3-pentafluoropropyl methacrylate, 2,2,3,4,4,4-hexafluorobutyl methacrylate and diacetone methacrylate, Maleimides are also suitable as comonomers and suitable examples include N-phenylmaleimide, N-(chlorophenyl) maleimide, N-(methylphenyl)maleimide, N-(isopropylphenyl)maleimide, N-(sulfophenyl)maleimide, N-methylphenylmaleimide, N-bromophenylmaleimide, N-naphthylmaleimide, N-hydroxyphenylmaleimide, N-methoxyphenylmaleimide, N-carboxyphenylmaleimide, N-(nitrophenyl)maleimide, N-benzylmaleimide, N-(4-acetoxy-1-naphthyl)maleimide, N-(4-oxy-1-naphthyl)maleimide, N-(3-fluoranthyl)maleimide, N-(5-fluoresceinyl)maleimide, N-(1-pyrenyl)maleimide, N-(2,3-xylyl)maleimide, N-(2,4-xylyl)maleimide, N-(2,6-xylyl)maleimide, N-(aminophenyl)maleimide, N-(tribromophenyl)maleimide, N-[4-(2-benzimidazolyl)phenyl]maleimide, N-(3,5-dinitrophenyl)maleimide, N-(9-acridinyl)maleimide, maleimide, N-(sulfo-phenyl)maleimide, N-cyclohexylmaleimide, N-methylmaleimide, N-ethylmaleimide and N-methoxyphenylmaleimide.

Suitable examples of fumaric acid diesters as comonomers include dihutyl fumarate, dipropyl fumarate, diethyl fumarate and dicyclohexyl fumarate, fumaric acid monoesters such as butyl fumarate, propyl fumarate and ethyl fumarate.

Maleic acid diesters such as dibutyl maleate, dipropyl maleate and diethyl maleate, and maleic acid monoesters such as butyl maleate, propyl maleate, ethyl maleate and cyclohexyl maleate, and acid anhydrides such as maleic anhydride and citraconic anhydride may also be suitable candidates as comonomers under this disclosure.

Examples of acrylamides suitable as comonomers include acrylamide, N-methylacryamide, N-ethylacrylamide, 2-hydroxyethyl-acrylamide, N,N-diethylacrylamide, acryloylmorpholine, N,N-dimethylaminopropylacrylamide, isopropylacrylamide, N-methylolacrylamide, sulfophenylacrylamide, 2-acrylamido-2-methylpropanesulfonic acid, 2-acrylamido-1-methylsulfonic acid, diacetoneacrylamide and acrylamidoalkyltrialkylammonium chloride, methacrylamides such as methacrylamide, N-methylmethacrylamide, N-ethylmethacrylamide, 2-hydroxyethylmeth-acrylamide, N,N-diethylmethacrylamide, N,N-di-methylmethacrylamide, N-methylolmethacrylamide, methacryloylmorpholine N,N-dimethyylaminopropylmethacrylamide, iso-propylmethacrylamide, 2-methacrylamido-2-methylpropanesulfonic acid and methacrylamidoalkyltrialkylammonium chloride.

In addition, vinylpyrrolidone, sulfophenyl-itaconimide, acrylonitrile, methacrylonitrile, fumaronitrile, α-cyanoethyl acrylate, citraconic acid, citraconic anhydride, vinyl acetate, vinyl propionate, vinyl pivalate, vinyl versatate, crotonic acid, itaconic acid, fumaric acid, maleic acid, mono-2-(methacryloyloxy)ethyl phthalate, mono-2-(methacryoyloxy)ethyl succinate, mono-2-(acryloyloxy)ethyl succinate, methacryloxypropyltri-methoxysilane, methacryloxypropyldimethoxysilane, acrolein, vinyl methyl ketone, N-vinylacetamide, N-vinylformamide, vinyl ethyl ketone, vinylsulfonic acid, allylsulfonic acid, dehydroalanine, sulfur dioxide, isobutene, N-vinylcarbazoie, vinylidene dicyanide, p-quinodimethane, chlorotrifluoroethylene, tetrafluoroethylene, norbornene, N-vinylcarbazole, acrylic acid, methacrylic acid and the like may also be co monomers under this disclosure.

Among these, in view of copolymerizability with p-styrenesulfonic acid (salt), availability and the like, preferred are methacrylic acid (salt), methyl methacrylate, 2-hydroxyethyl methacrylate, glycidyl methacrylate, maleic anhydride, maleic acid (salt), N-phenylmaleimide, N-cyclohexylmaleimide, methacrylamide, methacryloylmorpholine, styrene and styrene derivatives.

The choice of cation will influence the water dispersibility of the resulting polymer. Monovalent alkali metal ions yield polymers which are less readily dissipated by cold water and more readily dissipated by hot water, while divalent and trivalent metal ions result in polyesters that are not ordinarily easily dissipated by cold water but are more readily dispersed in hot water. It is possible to prepare the sulfopolymer using, for example, a sodium sulfonate salt and later by ion-exchange replace this ion with a different ion, for example, calcium, and thus alter the characteristics of the polymer. In general, this procedure is superior to preparing the polymer with divalent salts inasmuch as the sodium salts are usually more water soluble in the polymer manufacturing components than are the divalent metal salts. Polymers containing divalent and trivalent metal ions are normally less elastic and rubber-like than polymers containing monovalent ions.

Sulfonated addition-type polymers are more easily dispersed in water and/or form smaller aggregates in dispersion if the sulfonated addition type polymer has a high charge density. Cationic and anionic polymers are characterized by their charge density usually expressed in milliequivalents (meq) of anionic or cationic groups per gram of polymer. Charge densities of sulfonated addition type polymers suitable in this disclosure are in the approximate range of at least approximately 0.4 meq. and up to approximately to 0.9 meq/g.

Although the present disclosure has been described with reference to preferred embodiments, workers skilled in the art will recognize that changes may be made in form and detail without departing from the spirit and scope of the disclosure.

What is claimed:

1. A method of recycling a water dispersible sulfonated polymer material used as a structural component in an additive manufacturing process, the method comprising:
   providing a tap water bath heated to a temperature above ambient;
   placing a printed part having an adhered support structure into the tap water bath, the support structure comprising a water-soluble sulfonated polymer material;
   dissolving the sulfonated polymer material in the tap water bath to thereby create a dispersion consisting of tap water and the dissolved sulfonated polymer material;
   modifying the ionic strength of the dispersion by adding a salt to the dispersion at a concentration of between 1 gram/L and 10 grams/L, to precipitate the dissolved sulfonated polymer material from the water;
   recovering the precipitated sulfonated polymer material from the water;
   drying the recovered sulfonated polymer material; and
   reforming the dried sulfonated polymer material into a form suitable for subsequent use as a consumable feedstock in an additive manufacturing process.

2. The method of claim 1 wherein recovering the sulfonated polymer material from the water includes filtration, centrifugation, evaporation, sedimentation or combinations thereof.

3. The method of claim 1 wherein reforming the sulfonated polymer material comprises melting the material.

4. The method of claim 1 wherein the sulfonated polymer material is reformed into a filament comprising 100% recovered water dispersible sulfonated polymer.

5. The method of claim 1 wherein the sulfonated polymer material is reformed into a powder comprising 100% recovered water dispersible sulfonated polymer.

6. The method of claim 5 and further comprising adding a charge agent to the powder to create a toner powder material suitable for use in an electrophotographic additive manufacturing process.

7. The method of claim 6 wherein the sulfonated polymer material comprises a reaction product of a condensation type polymeric reaction or a reaction product of an addition type polymer reaction.

8. The method of claim 1 wherein the sulfonated polymer material is dissolved in approximately 30 minutes or less.

9. The method of claim 8 wherein the water bath temperature is about 70 C.

10. The method of claim 1 wherein the sulfonated polymer material is dissolved in approximately 15 minutes or less.

11. The method of claim 1 and further comprising using the reformed water dispersible sulfonated polymer material as a consumable feedstock in a subsequent additive manufacturing process.

12. The method of claim 1, wherein the salt comprises NaCi or KCl.

* * * * *